United States Patent [11] 3,576,356

[72] Inventors Clifton E. Hyman
Kingston;
George M. Krembs, Hyde Park, N.Y.
[21] Appl. No. 790,951
[22] Filed Jan. 14, 1969
[45] Patented Apr. 27, 1971
[73] Assignee International Business Machines Corporation
Armonk, N.Y.

[54] ANTIGLARE COATING FOR CATHODE-RAY TUBE USED WITH CAPACITIVE COUPLED VOLTAGE PEN
4 Claims, 1 Drawing Fig.

[52] U.S. Cl. 350/156, 178/18, 313/112, 340/324A, 350/157, 350/164
[51] Int. Cl. G02b 27/28
[50] Field of Search 350/152, 157, 166, (Inquired); 350/147, 156, 164; 235/198; 178/18, 19, 20; 340/324 (A); 346/74 (CRT), 74 (ES); 313/112

[56] References Cited

UNITED STATES PATENTS

| | | | |
|---|---|---|---|
| 2,793,361 | 5/1957 | White | 350/156X |
| 2,918,670 | 12/1959 | Cusano et al. | 350/156X |
| 3,356,523 | 12/1967 | Libbert | 350/166UX |
| 3,498,692 | 3/1970 | Jewitt et al. | 350/266X |
| 3,094,436 | 6/1963 | Schroder | 117/215 |
| 3,423,528 | 1/1969 | Bradshaw et al. | 118/19 |
| 3,518,373 | 6/1970 | Cushera et al. | 178/7.85 |

*Primary Examiner*—David Schonberg
*Assistant Examiner*—Paul R. Miller
*Attorneys*—Hanifin and Jancin and Joseph J. Connerton

ABSTRACT: A multilayer optical transparent coating in conjunction with a circular polarizer that reduces glare and provides capacitive coupled voltage pen action. The transparent multilayer antireflective coating circular polarizer structure permits visual observation of the information on the face of the cathode-ray tube with minimum glare and reflection and also maintains a potential field across one of the layers of the antireflective coating. The potential field is utilized for correlating a pen position on the outer surface of the multilayer coating.

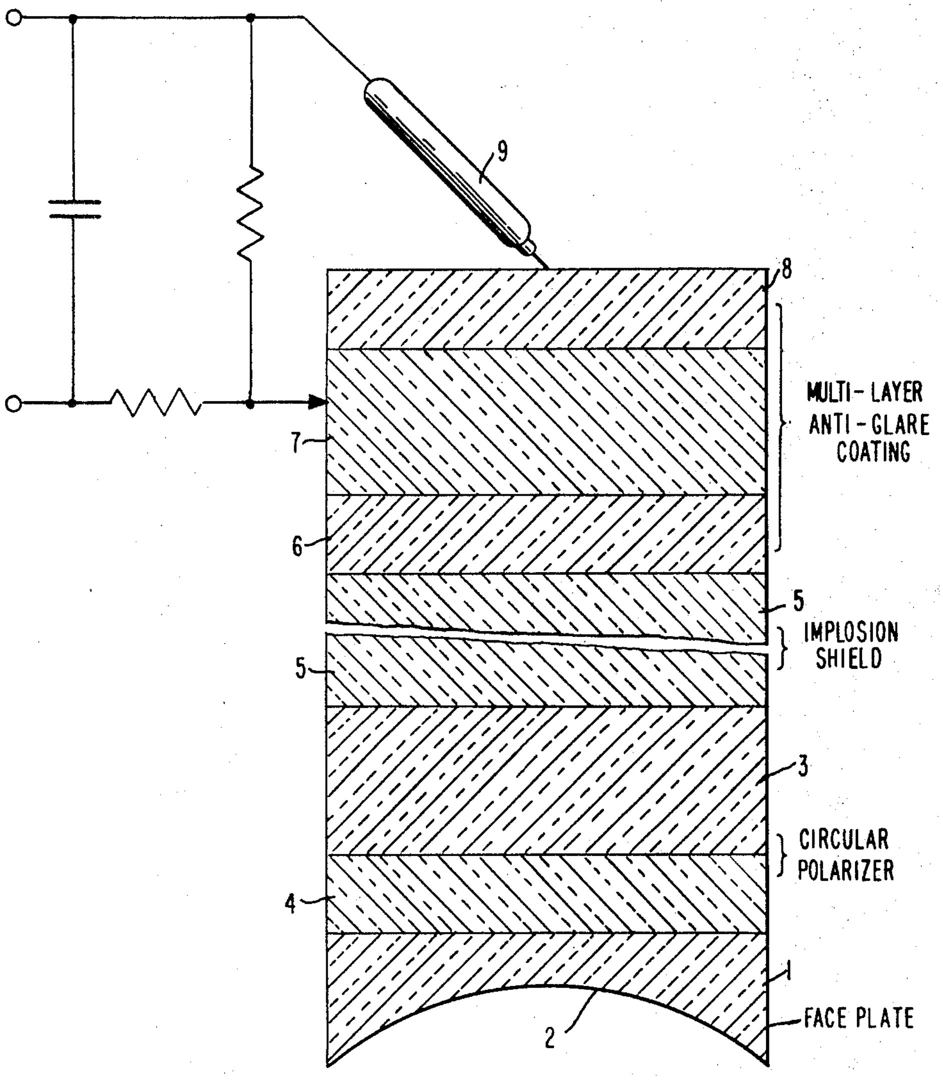
INVENTORS
CLIFTON E. HYMAN
GEORGE M. KREMBS
BY [signature]
ATTORNEY

ANTIGLARE COATING FOR CATHODE-RAY TUBE USED WITH CAPACITIVE COUPLED VOLTAGE PEN

BACKGROUND OF THE INVENTION

The present invention relates to an antireflective coating for a cathode-ray tube faceplate. More particularly, it relates to a coating which has interposed conductive and antireflective layers so as to achieve the functions of reducing glare and providing capacitive coupled voltage pen action.

The operation of a graphic CRT display console usually involves the inputs of some type of keyboard or pen input information and the observation and response of each data entry. The information which is entered into the console is converted into digital data that is transmitted to the computer that controls the regeneration of the display patterns on the CRT console. This pattern usually consists of graphic and alphanumeric information which may be modified by means of the pen input which is used by the operator to effectively write information on the fact of the CRT. Various types of pen inputs are available for graphic display systems, such as light pens, conductive pens and capacitive coupled voltage pens. A general discussion of these alternative pen inputs may be found in an article by Ivan E. Sutherland entitled "Computer Inputs and Outputs", and appearing in Scientific American, Sept. 1966, Vol. 215, No. 3, pp. 86—96. Furthermore, embodiments of the light pen and the conductive pen are disclosed in U.S. Pat. applications, S.N. 697,864, filed Jan. 15, 1965, and Ser. No. 436,818, filed Mar. 3, 1965, now Pat. No. 3,423,528 respectively, and are assigned to the same assignee as the present invention.

One of the advantages of pen inputs responsive to electric field effects, such as the capacitance coupled voltage pen, is the elimination of the need for a tracking symbol as disclosed in Ser. No. 697,864. This type of pen system is able to sample every coordinate point on the face of the CRT at a compiling rate comparable to the switching of the electric field on the faceplate of the CRT. This allows for very high resolution pen tracking without the need of drawing a tracking symbol during every generation of a display pattern. Also, another advantage is the elimination of moving the tracking symbol to a beginning point prior to every start of a pen tracking routine.

Computer controlled CRT (cathode-ray tube) displays are generally operated in a high ambient illumination environment so as to enable the operator of the CRT to operate with the CRT console. In this environment, glare and reflection from the face of the CRT pose severe annoyances to the operator in viewing high density graphics and result in inability to recognize graphic and alphanumeric information, thereby causing eye fatigue. In this ambient environment, about 4 percent of the light incident on the face of the CRT is specularly reflected at the air/glass interface and possibly an additional 6—18 percent is diffused reflected light from the glass/phosphor interface. Thus, approximately 10—24 percent of the light incident on the CRT is reflected.

In the general environment in which a CRT console is used, the acceptable mode of dress of most operators usually consists of nonlight-absorbing clothing. Thus, light is reflected from the operator and adds to the reflective problem mentioned above. The reflected light from the operator is mostly of a polarized form with its vibrational direction parallel to the reflecting surface. The total amount of reflection from both the CRT and the operator causes the CRT to serve as a poor quality mirror with the image object in the form of the operator seen on the face of the CRT. In addition, the high ambient illumination causes contrast degradation of the graphics which is further degraded by the reflected image on the CRT faceplate.

It is therefore a primary object of the present invention to provide an improved cathode-ray tube coating for a capacitive-coupled voltage pen system.

Another object of the present invention is to eliminate glare from a cathode-ray tube faceplate coating by means of an antiglare coating.

A further object of the present invention is to combine a circular polarizer with a triple layer antireflective coating which has the necessary characteristics of suppressing glare and reflection from the face of a computer controlled CRT and provides the ability to sense inputs from a voltage writing stylus on the face of the triple-layer coating.

The foregoing and other objects, features and advantages of the invention will be apparent from the following and more particular description of a preferred embodiment of the invention, as illustrated in the accompanying drawing.

In the drawing, the FIG. is a schematic representation of a cross section of a cathode-ray tube faceplate which has an antireflective coating on its surface.

In accordance with this invention a triple-layer antireflective coating is provided to satisfy the requirements of reduction of glare and reflective light and allow a capacitive-coupled voltage pen capability for inputting graphic information onto a computer controlled display CRT. A triple layer quarter-wave antireflective coating in combination with a circular polarizer and a glass implosion shield provides a writing CRT tablet which is capable of suppressing glare and static while still maintaining high resolution and high contrast that is required for viewing high density computer generated graphics in high ambient illumination environment.

The circular polarizer renders an increase in contrast and suppresses diffused reflectance from the glass/phosphor interface while the antireflective coating eliminates specular reflectance or glare from the air/glass interface and provides a conductive layer that may have a voltage gradient that is sensed by a capacitive-coupled voltage pen. The triple layer coating consists of individual layers varying in either quarter, half, or three-quarter wavelength thicknesses. By choosing a proper thickness in combination with a specific index of refraction, N, for each layer, suitable suppression of specular reflected light in the visible region of the spectrum is effected. The middle layer of the triple layer coating consists of a semiconductive material which is overlayed by a dielectric material so as to provide an electric field between a voltage pen and the semiconductor material. The capacitance across the dielectric varies with particular coordinate positions depending on the potential of the semiconductor at the coordinate point that corresponds to the position of the pen. By sensing the capacitance across the pen and the semiconductor material, the information retrieved during sensing is digitized and is imputed to a computer which processes the information and intensifies a corresponding coordinate point on the phosphor of the CRT by means as disclosed in Ser. No. 436,818.

DETAILED DESCRIPTION OF THE INVENTION

Referring to the FIG., there is shown a cross-sectional diagram of the coating material bonded to the faceplate of a CRT. The faceplate 1 is formed by a glass surface having a phosphor coating on the inner surface 2 which is intensified by an electron beam of the CRT not shown. Onto the faceplate 1, there is bonded a circular polarizer which suppresses the diffused reflectance from the glass/phosphor interface. The circular polarizer consists of a single plane polarizing filter 3 mated with a quarter-wave retarder 4. The unpolarized light passing through the linear polarizing filter 3 becomes linearly polarized and is rotated 45° by the quarter-wave retarding coating 4. The linearly polarized light traversing through the quarter-wave retarder consists of two equal, but opposite polarized components. One component is retarded by a quarter of a wavelength. This combination wave front consists of circularly polarized light of either left or right rotation. When the circularly polarized light is reflected from a specular reflecting surface, the rotation reverses. In a reentry through the quarter-wave retarding layer, an additional quarter-wave shift results. This shift causes a circular polarized light to be transformed into linearly polarized light in a plane of 90° to its original entrance plane, and the back reflected light is absorbed by the linearly polarizer component 3. On the surface of the circular polarizer, that is the surface formed by the linear polarizer 3, a glass implosion shield 5 is laminated. The shield serves as a safety function for the protection of the operator and is a necessary constructive element in the manufacture of a cathode-ray tube. On the surface of the implosion shield, there is bonded an antireflective coating consisting of a first, a second, and a third layer. The first layer 6 is formed by a transparent crystalline dielectric material whose refractive index is in a range of 1.6 to 1.8. The second layer material 7 consists of a transparent semiconductive material whose refractive index is in the range of 1.9 to 2.6. The third layer material 8 is in a transparent dielectric material whose refractive index is in the range of 1.35 to 1.50. These triple layers form the antireflective coating and the dielectric 8 forms an antireflective layer which maintains an electric field between the semiconductive material and the pen 9.

One possible configuration of the layer coatings could consist of a low-high-low refractive index material of the respective thickness of $\lambda/(4N)$, $\lambda/(2N)$ and $3\lambda/(4N)$. However, alternative combination of layer thickness and materials of different refractive indices may form numerous acceptable combinations. The most significant consideration in the choice of index of refraction and material, appears to be the thickness of the outer dielectric layer 8 and the middle layer 7 since it is increasingly difficult to reduce the reflectance at the air/dielectric interface and to control uniform resistivity in the semiconductor. Although the disclosed embodiment utilizes layer thicknesses of $\lambda/(4N)$, $\lambda/(2N)$ and $3\lambda/(4N)$, these thicknesses may vary within a reasonable tolerance of $\pm20$ percent for the $\lambda/(2N)$ layer and $\pm20$ percent for the $3\lambda/(4N)$ layer.

Some of the materials which have suitable indices of refraction and other properties which make the materials acceptable for use in the multilayer antireflective coating are listen in the following table;

TABLE

| Layer | Material | Index of refraction at $\lambda_0$= 550m$\mu$ |
|---|---|---|
| I | Silicon monoxide (slow oxidized), $Si_2O_3$ | 1.5-1.80 |
| | Cerious fluoride, $CeF_3$ | 1.65-1.70 |
| | Aluminum oxide, $Al_2O_3$ | 1.76 |
| II | Silicon monoxide (fast unoxidized), SiO | 2.00 |
| | Zinc sulfide, ZnS | 2.35 |
| | Titanium dioxide, $TiO_{2-x}$ | 2.50-2.70 |
| | Bismuth trioxide, $Bi_2O_3$ | 1.92 |
| | Tin oxide, $SnO_{2-x}$ | 2.00 |
| | Indium oxide, $In_2O_{3-x}$ | 1.60-1.75 |
| III | Magnesium fluoride, $MgF_2$ | 1.38 |

As shown in the table, the index of refraction of the first layer which forms the interface with the glass is in the range of 1.50 to 1.80. This layer must also satisfy the requirement that it be an oxide which is compatible with the physical properties of glass and forms a good glass-to-metal-oxide bond. The second layer of the triple layer coating has a refractive index in the range of 1.90 to 2.60 with a requirement that the material be transparent and semiconductive. As shown in the table, the index of refraction of the third layer of $MgF_2$ is 1.38 which is in the range of 1.35 to 1.50. Magnesium fluoride also has the advantageous property of being able to resist deterioration under continuous contact with a voltage pen as the operator writes on the surface.

The graphic display CRT is usually operated with the anode being at high potentials. In this mode of operation, the faceplate of the CRT has a tendency to develop charge. By using a layer of transparent semiconductive material on the faceplate, the semiconductive layer can be made to carry off these static charges and thereby provide a further advantage as antistatic coating.

The materials indicated in the table show alternative types of semiconductive materials which may be utilized. However choice of the material should be limited to materials having a conductivity in the order of $10^{13}$(ohm-cm.)$^{-1}$. The material which is used as the dielectric layer should have resistivity greater than $10^{14}$ ohm-cm. and be capable of withstanding field stresses greater than $10^6$volts/cm. The magnesium fluoride material provides these criteria. The materials listed in the table are considered to be illustrative and those skilled in the art may substitute other equivalent materials to make an alternative embodiment.

While the disclosed embodiment utilizes the combination of the multilayer coating in combination with a circular polarizer, it is recognized that the multilayer coating may be used by itself. This type of structure would still provide antiglare and also allow the CRT to be used with a capacitive-coupled voltage pen. However, without the circular polarizer, suppression of high diffusion reflection is not attained whereby diffused reflected light would be visible to the operator.

While the invention has been particularly shown and described with reference to the preferred embodiment thereof, it will be understood by those skilled in the art that various changes in form and details may be made therein without departing from the spirit and scope of the invention.

We claim:

1. An antiglare cathode-ray tube faceplate coating for use in a graphic display system having a capacitive-coupled voltage pen input comprising:

a first surface which forms the faceplate of said cathode ray tube;

a first layer of transparent crystalline material bonded to said first surface having a refractive index in the range of 1.60 to 1.80 and a thickness which is a factor of $\lambda/4$ where $\lambda$ is a wavelength of light in the visible region of the spectrum; a second layer of transparent semiconductor material bonded to said first layer having a refractive index in the range of 1.90 to 2.60 and a thickness which is a factor of $\lambda/4$ where $\lambda$ is a wavelength of light in the visible region of the spectrum; and a third layer of transparent dielectric material bonded to said second layer and forming an outer surface, said third layer having an index of refraction in the range of 1.35 to 1.50 and a thickness which is a factor of $\lambda/4$ where $\lambda$ is a wavelength of light in the visible region of the spectrum.

2. An antiglare cathode-ray tube faceplate coating for use in a graphic display system having a capacitive-coupled voltage pen input comprising:

a first surface which forms the faceplate of said cathode-ray tube;

a circular polarizer bonded to said first surface for suppressing reflected light from said faceplate;

a first layer of transparent crystalline material bonded to said circular polarizer having a refractive index in the range of 1.60 to 1.80 and a thickness which is a factor of $\lambda/4$ where $\lambda$ is a wavelength of light in the visible region of the spectrum;

a second layer of transparent semiconductor material bonded to said first layer having a refractive index in the range of 1.90 to 2.60 and a thickness which is a factor of $\lambda/4$ where $\lambda$ is a wavelength of light in the visible region of the spectrum;

a third layer of transparent dielectric material bonded to said second layer and forming an outer surface;

said third layer having a refractive index in the range of 1.35 to 1.50 and a thickness which is a factor of $\lambda/4$ where $\lambda$ is a wavelength of light in the visible region of the spectrum.

3. The structure as defined in claim 2 wherein said circular polarizer comprises a single plane polarizing film mated with a quarter-wavelength retarder, where said wavelength is chosen in the visible spectrum.

4. The structure as defined in claim 3 wherein the thickness of said first, second, and third layers are factors of $\lambda/4$ where $\lambda$ is the wavelength of light at 550nm. in the visible region.